United States Patent [19]
Fussell

[11] Patent Number: 5,199,893
[45] Date of Patent: Apr. 6, 1993

[54] SEISMIC CONNECTOR WITH REPLACEABLE SEAL

[76] Inventor: Don L. Fussell, 16818 Bobcat Trail, Cypress, Tex. 77429

[21] Appl. No.: 733,609

[22] Filed: Jul. 22, 1991

[51] Int. Cl.$^5$ ............................................. H01R 13/52
[52] U.S. Cl. ................................. 439/271; 439/281; 439/587
[58] Field of Search ............................. 439/271–283, 439/586, 587

[56] References Cited

U.S. PATENT DOCUMENTS

| | | | |
|---|---|---|---|
| 3,121,598 | 2/1964 | Marasco | 439/282 |
| 3,601,761 | 6/1971 | Harris | 439/281 |
| 3,673,541 | 6/1972 | Volinskie | 439/271 |
| 4,166,664 | 9/1979 | Herrmann, Jr. | 439/271 |
| 4,609,247 | 9/1986 | Annoot | 439/591 |
| 4,640,567 | 2/1987 | Lundergan et al. | 439/271 |
| 4,917,632 | 4/1990 | Smith | 439/281 |

Primary Examiner—David L. Pirlot
Attorney, Agent, or Firm—Dodge, Bush, Moseley & Riddle

[57] ABSTRACT

In accordance with an illustrative embodiment of the present invention, a connector assembly for plugging geophones into a leader cable includes rigid thermoplastic inserts that are positioned within molded polyurethane bodies and molecularly bonded thereto. The male connector member carries a replaceable silicone O-ring seal in an external annular groove therein which engages an internal annular recess on the female body when the connection is made up. The seal keeps out moisture, and releasably couples the connector members together.

9 Claims, 1 Drawing Sheet

SEISMIC CONNECTOR WITH REPLACEABLE SEAL

FIELD OF THE INVENTION

Seismic exploration on land usually involves laying out one or more geophone strings that are electrically connected together to provide a data channel that leads to a recording instrument. The geophones, which are attached to the ground and spaced points, sense reflected acoustic waves generated by a seismic source and provide electrical outputs that are representative thereof. The outputs of the geophones are connected to a leader cable that goes to the recorder. The seismic data traced or stored on tape by the recorder can be used to construct stratigraphic maps of the underground formations that are an immense aid to the exploration for hydrocarbon deposits.

Various types of take-out connections between a leader cable and a geophone have been proposed, since the integrity of these connections clearly is crucial to successful seismic surveys. A commonly used connection, shown for example in U.S. Pat. No. 4,609,247, has male and female plug members that are made of molded polyurethane or of molded neoprene rubber. A seal which is designed to keep out moisture is a ring-like formation on the male member that is molded as an integral part thereof. The ring fits into a companion inner recess on the female member where the connection is made up. However, this type of construction has several disadvantages. For one thing, polyurethane has no "shape memory" and will cold flow in use and lose its sealing effectiveness. For another, if a sealing ring that is molded as an integral part is nicked or cut in use, then the entire connector assembly must be replaced. Still another problem with prior connectors is that when used in cold regions of the earth where the temperature may drop as low as $-40°$ F., polyurethane becomes very hard to the point where connector members cannot be plugged together, or unplugged from one another. Some devices can be plugged in backwards under these conditions, however there is no seal to keep out moisture.

The general object of the present invention is to provide a new and improved seismic connector that is constructed and arranged to obviate the above-mentioned problems.

SUMMARY OF THE INVENTION

This and other objects are attained in accordance with the concepts of the present invention through the provision of a seismic connector comprising opposed, insert-type connector members made of a rigid thermoplastic material having a relatively high hardness value of about 80–90 Durometer A. Each member carries at least one pin and at least one socket that can be mated to one another to provide electrical connections. The side and rear walls of each insert are molecularly bonded to inner walls of an outer tubular sleeve that is made of a more flexible and resilient thermoplastic material. The sleeve on one insert member extends beyond the outer face of the member insert to provide the female portion of the connector assembly. An outer portion of the other insert member extends beyond the outer end of its sleeve to provide the male portion of the connector assembly. An external annular groove is formed in the exposed portion of the male member and receives a silicone O-ring. An internal annular groove formed in the sleeve over the female member is sized and spaced to receive the silicone O-ring when the connector members are pushed together. A chamfered inner surface at the outer end of the female member sleeve engages the O-ring to cause expansion of the end portion as the O-ring is being positioned in the internal annular groove. When engaged, the O-ring seals out moisture and provides a detente to releasably lock the members together.

The material from which the inserts are made provides a rigid seat for the silicone O-ring to optimize the moisture proof sealing, and the material will not cold flow and lose its original shape. If need be, the silicone O-ring can simply be replaced rather than having to remold the whole connector assembly in the event of damage. The silicone O-ring remains flexible at temperatures as low as $-80°$ F., so that the connector still can be easily made up or unplugged at extremely low temperatures. The molecular bonding provides a monolithic connector body that is extremely sturdy and rugged in use.

BRIEF DESCRIPTION OF THE DRAWINGS

The present invention has other objects, features and advantages which will become more clearly apparent in connection with the following detailed description of a preferred embodiment, taken in conjunction with the appended drawings in which.

DETAILED DESCRIPTION OF A PREFERRED EMBODIMENT

Figure 1:
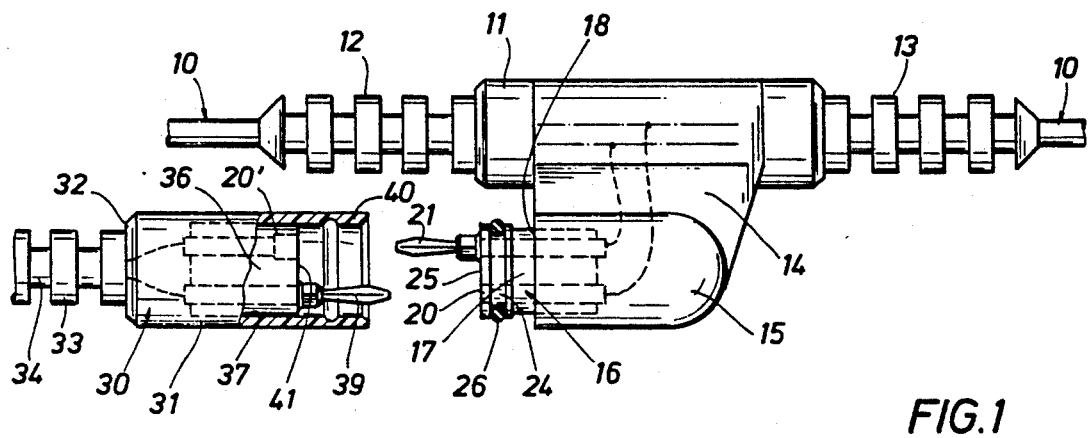
FIG. 1 is a side view, with some portions in section, of the male and female connector members of the present invention.

Referring initially to FIG. 1, a seismic cable 10 having a plurality of insulated conductor wires within an outer sheath extends through an enlarged diameter, molded take-out body 11 having stress relief members 12, 13 at each end. The body 11 is molded with a side wing 14 and a laterally offset, generally tubular connector body 15 an open outer end 18 that receives an insert member 16. The outer portion 17 of the insert member 16 extends past the outer end surface of the body 15 so as to form the male part of the connector. The insert 16 carries a pair of electrical connections, such as a socket 20 and a banana pin 21. The pin 21 is screwed into a conductive rod 21' that extends to the rear of the insert, and the socket 20 leads to a conductive metal tube 20' which also extends to the rear. The rear ends of the rod 21' and the tube 20' are connected to conductor wires shown in dash lines that are embedded in the wing 14 and extend to the respective conductor wires of the cable 10 that pass through the take-out body 11.

The insert member 16 has a generally cylindrical shape and is made of a rigid thermoplastic material whose outer surfaces can be molecularly bonded to the adjacent inner surfaces of the body 15 which is made, for example, of a more flexible, resilient material such as polyurethane. The insert 16 has a high hardness value in the range of from 80–90 Durometer A. An external annular groove 24 is formed in a slightly raised surface adjacent the outer end face 25 of the insert 16, and the groove receives a silicone O-ring seal 26. The groove 24 has a considerably greater depth dimension than a standard O-ring groove would have for the particular size of the silicone O-ring 26, and has a depth that is approximately 75% of the radial thickness of the ring 26. Such greater depth positively prevents the ring 26 from rolling out of the groove 24 as the connector members are made up.

The female connector member 30 includes a generally tubular body 31 having a rear wall 32 and a stress relief member 33 that are molded as a unit like the elements 11 and 12. A cable that extends to a geophone (not shown) has insulated conductor wires within an outer sheath which extend through the relief member 33, the rear wall 32, and into the cavity 37 inside the body 31. Another insert member 36 that is constructed exactly like the insert member 16 is fitted into the cavity 37 and has its outer and rear walls molecularly bonded thereto. A pin 39 which will mate with the socket 20 in the element 16, and a socket 20' that will mate with the pin 21, are carried by the insert 36. The outer tubular portion 40 of the body 31 extends beyond the outer end face 41 of the insert member 36 by a distance that is substantially equal to the length of the outer portion 17 of the male insert member 16 which extends beyond the outer end face of the body 15. The rear ends of the socket 20' and the pin 39 are connected as shown by dash lines to the conductor wires in the cable.

Figures 2A, 2B:
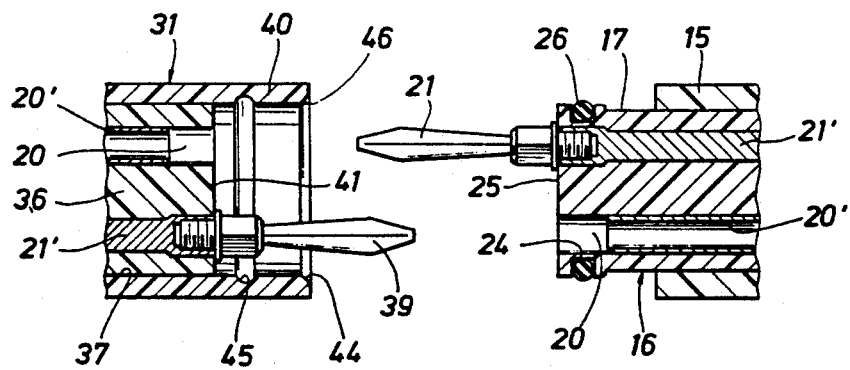
FIGS. 2A and 2B are enlarged, fragmentary sectional views of the front portions of the male and female connector members.

As illustrated in more enlarged detail in FIGS. 2A and 2B, the outer portion 40 of the body 31 is formed with a chamfer surface 44 and an internal annular recess or groove 45 which preferably has a semi-circular section. The outer edge 46 of the chamfer 44 has substantially the same transverse dimension as the o.d. of the silicone O-ring 26, so that when the outer portion 17 of the insert member 16 is pushed into the outer portion 40 of the body 31, such outer portion, being relatively flexible, is expanded somewhat by the O-ring 26 so that the O-ring can be positioned opposite the internal recess 45. At this position the outer part of the ring 26 enters to groove 45 as the portion 40 resiles inward to cause the recess and seal ring to interfit with one another and provide a moisture-proof seal. These elements also function as a detent to releasably hold the connector halves together.

In use, the leader cable 10, which has the take-out bodies 11 formed thereon at the spaced points where geophones are to be located out on the ground along a selected seismic survey line. The geophones are attached to the ground, usually by a spike, and each of their cables 34, which extend to respective take-out bodies 11, are connected to the leader cable conductors by pushing the female connector member 30 onto the outer portion 17 of the male insert member 16. The outer end of the leader cable 10 can have a female member 30 thereon which is looped back and pushed onto a male member 16 to terminate such outer end.

A seismic source is operated to produce an acoustic wave or vibratory energy that travels down through the earth and is reflected upward at boundaries between earth strata which have a substantial impedance mismatch. The reflected waves are sensed by the various geophones in the string which generate electrical signals that are representative thereof. Such signals are fed by the leader cable 10 to the recording instruments.

The thermoplastic material from which the male insert 16 is made provides a rigid seat for the silicone O-ring seal 26 so that its ability to keep out moisture is assured. Such material will not cold flow and lose its shape at or near the edges of the groove 24, which would otherwise cause leakage problems. If the silicone O-ring 26 should need to be replaced, this can be easily accomplished in the field since it is a separate part. This particular type of O-ring seal remains flexible at very low field temperatures so that the connector members 16 and 30 still can be plugged and unplugged without difficulty. The molecular bonding of external walls of the insert members 16 and 36 to the surrounding walls of the plug bodies creates resultant monolithic connector structures that are very rugged and which will not separate. The greater depth of the O-ring groove 24 prevents the seal ring from being rolled out of the groove during connection or disconnection.

It now will be recognized that a new and improved seismic connector assembly has been disclosed which has all the features and advantages, and which meets the objectives of the present invention. Since certain changes or modifications may be made in the disclosed embodiment without departing from the inventive concepts involved, it is the aim of the appended claims to cover all such changes and modifications which fall within the true spirit and scope of the following claims.

What is claimed is:

1. A seismic connector assembly comprising: a first connector means including a male insert member bonded within a first tubular body having an outer end, said male insert member having an outer portion extending beyond said outer end of said body; a second connector means including a female insert member having an outer face and being bonded within a second tubular body, an outer portion of said second tubular body extending beyond said outer face of said female insert member, said outer portion of said male insert member being arranged to be received within said outer portion of said second tubular body when said connector assembly is made up; internal annular recess means on said outer portion of said second tubular body; and replaceable seal ring means on said outer portion of said male insert member arranged to engage said recess means when said connector assembly is made up to prevent the entry of moisture and to releasably hold said first and second connector means together.

2. The assembly of claim 1 wherein said male and female members each have at least one pin and at least one socket arranged therein so that said pins and sockets mate with one another when said connector means are made up.

3. The assembly of claim 1 further including a leader cable having at least one pair of conductor wires therein; and means for mounting said first connector means in a laterally offset position with respect to the longitudinal axis of said leader cable.

4. The connector assembly of claim 1 wherein said male and female insert members are made of a rigid thermoplastic material having external surfaces that are molecularly bonded to adjacent surfaces of said first and second tubular bodies; external annular groove means in the outer wall of said outer portion of said male insert member arranged to receive said replaceable seal ring means, said material of said male insert member providing relatively hard walls for said groove means to retain said seal means therein.

5. The assembly of claim 4 wherein said replaceable seal ring means is a silicone O-ring.

6. The assembly of claim 4 wherein said end portion of said second tubular body has an internal chamfered surface adjacent the outer end face thereof, said internal annular recess being spaced axially inward of said chamfered surface, said second tubular body being made of a resilient thermoplastic material so that as said connector means are made up said chamfered surface coacts with said seal ring means to cause expansion of said end portion to allow said seal means to engage said internal annular recess means.

7. The assembly of claim 4 wherein said groove means has width and depth dimensions that are sized to prevent roll-out of said seal ring means during engagement and disengagement of said connector means.

8. A male seismic connector adapted to make an electrical connection between a geophone and a leader cable, comprising: a generally tubular molded elastomer body having an open outer end and an internal cavity extending inward from said open outer end; a generally cylindrical, rigid thermoplastic insert member having an outer end portion, said member being mounted partially in said cavity so that said outer end portion of said insert member extends outside said cavity and beyond said open outer end of said body, the outer surfaces of said insert member which are within said cavity being molecularly bonded to adjacent inner surfaces of said body, said insert member having electrical pin and socket means; an external annular groove in said outer end portion; and a replaceable silicone O-ring seal mounted in said groove.

9. A female seismic connector member adapted to make an electrical connection between a geophone and a leader cable, comprising: a generally tubular molded elastomer body having an open outer end portion, said body having an internal cavity extending from said open outer end portion; a generally cylindrical, rigid thermoplastic insert member having front, rear and outer walls and being mounted completely within said cavity and in a manner such that said outer end portion of said tubular body extends beyond said front wall of said insert member, said outer and rear walls of said insert member being molecularly bonded to adjacent inner surfaces of said body, said insert member having electrical pin and socket means; and an internal annular recess means on said outer end portion of said tubular body for receiving the outer portion of a seal ring mounted on a mating male connector member that prevents entry of moisture.

* * * * *